(12) United States Patent
Foskey et al.

(10) Patent No.: US 10,618,632 B2
(45) Date of Patent: Apr. 14, 2020

(54) FOLDABLE ROTOR BLADE ASSEMBLY

(71) Applicant: Bell Helicopter Textron Inc., Fort Worth, TX (US)

(72) Inventors: Christopher E. Foskey, Keller, TX (US); Michael C. Burnett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 340 days.

(21) Appl. No.: 15/430,956

(22) Filed: Feb. 13, 2017

(65) Prior Publication Data
US 2018/0229830 A1    Aug. 16, 2018

(51) Int. Cl.
  *B64C 29/00* (2006.01)
  *B64C 11/28* (2006.01)
  *B64C 27/50* (2006.01)

(52) U.S. Cl.
  CPC .............. *B64C 11/28* (2013.01); *B64C 27/50* (2013.01); *B64C 29/0033* (2013.01)

(58) Field of Classification Search
  CPC ......... B64C 11/28; B64C 11/20; B64C 27/50; B64C 27/473; B64C 29/00; B64C 29/0091; B64C 29/0033
  See application file for complete search history.

(56) References Cited

U.S. PATENT DOCUMENTS

| | | | | |
|---|---|---|---|---|
| 2,568,230 A * | 9/1951 | Gluhareff | ................ | B64C 27/48 416/225 |
| 2,672,941 A * | 3/1954 | Jovanovich | ............. | B64C 27/37 416/103 |
| 2,925,130 A * | 2/1960 | Buivid | .................... | B64C 27/50 416/143 |
| 2,951,541 A * | 9/1960 | Hinds | ..................... | B64C 27/48 416/226 |
| 3,135,333 A * | 6/1964 | Cruz | ....................... | B64C 27/50 16/347 |
| 3,321,019 A * | 5/1967 | Dmitroff | ................. | B64C 27/48 416/229 R |
| 4,691,878 A * | 9/1987 | Vaughan | .................. | B64C 3/56 244/49 |
| 4,712,978 A * | 12/1987 | Tiemann | ................. | B64C 27/50 416/1 |
| 4,868,962 A * | 9/1989 | McArdle | ............... | B29C 70/347 29/889.6 |
| 4,936,526 A * | 6/1990 | Gries | ..................... | B64C 11/28 244/53 R |

(Continued)

*Primary Examiner* — Charles G Freay
*Assistant Examiner* — Thomas Fink
(74) *Attorney, Agent, or Firm* — Timmer Law Group, PLLC

(57) ABSTRACT

An adapter for a rotor blade assembly including a support member having an outboard surface and an inboard surface; an outboard feature extending laterally from the outboard surface of the support member and including a first lug and a second lug; an inboard feature extending laterally from the inboard surface of the support member and including a first arm and a second arm. The outboard feature and the inboard feature are configured such that a plane defined by an attachment surface of at least one of the first lug and the second lug is non-parallel to a plane defined by an attachment surface of at least one of the first arm and the second arm.

14 Claims, 13 Drawing Sheets

(56) References Cited

U.S. PATENT DOCUMENTS

| | | | |
|---|---|---|---|
| 5,031,858 A * | 7/1991 | Schellhase | B64C 27/50 244/7 R |
| 5,059,094 A | 10/1991 | Robinson et al. | |
| 5,074,753 A * | 12/1991 | Covington | B64C 27/48 416/141 |
| 5,868,351 A * | 2/1999 | Stamps | B64C 27/50 244/12.4 |
| 6,659,722 B2 | 12/2003 | Sehgal et al. | |
| 2003/0146346 A1* | 8/2003 | Chapman, Jr. | B64F 5/10 244/123.3 |
| 2004/0026564 A1* | 2/2004 | Romani | B64C 27/50 244/17.11 |
| 2006/0239824 A1* | 10/2006 | Robertson | B64C 11/16 416/231 B |
| 2008/0131280 A1* | 6/2008 | Krauss | B64C 27/10 416/131 |
| 2011/0206529 A1* | 8/2011 | Bell | B29C 65/48 416/226 |
| 2012/0018660 A1* | 1/2012 | Halcom | B64C 27/50 251/327 |
| 2015/0251752 A1* | 9/2015 | Gaffiero | B64C 27/50 416/143 |
| 2016/0040651 A1* | 2/2016 | Yarbrough | F03D 1/0675 416/226 |
| 2016/0152329 A1* | 6/2016 | Tzeng | B64C 29/0033 416/134 R |
| 2016/0229531 A1* | 8/2016 | Robertson | B64C 29/0033 |
| 2016/0311553 A1* | 10/2016 | Alber | B64D 39/04 |
| 2017/0121018 A1* | 5/2017 | Hunter | B64C 27/50 |
| 2017/0297698 A1* | 10/2017 | Alber | B64C 29/0033 |
| 2018/0281942 A1* | 10/2018 | Scott | B64C 29/02 |

* cited by examiner

FOLDABLE ROTOR BLADE ASSEMBLY

BACKGROUND

Technical Field

The present disclosure relates to aircrafts and, more particularly, to aircraft rotor assemblies and components thereof.

Description of Related Art

Many traditional rotor assemblies are not configured to permit folding of rotor blades. In rotor assemblies that do enable folding of rotor blades, complex and costly load-bearing material configurations are required to adequately transfer load from the rotor blades to a rotor hub without damaging one or more components of the rotor assembly and/or without affecting operation of the rotor assembly. Furthermore, removal of one or more aircraft or rotor blade components may be required to enable folding of rotor blades, which can complicate the folding procedure and can increase the time and complexity required to fold rotor blades.

There is a need for an improved foldable rotor assembly that can achieve desired load-bearing characteristics in a time-efficient, low-cost, and simple manner.

SUMMARY

In a first aspect, there is an adapter for a rotor blade assembly including a support member having an outboard surface and an inboard surface; an outboard feature extending laterally from the outboard surface of the support member and including a first lug extending laterally from the outboard surface of the support member and having an attachment surface configured to couple to an outboard portion of a rotor blade assembly; and a second lug extending laterally from the outboard surface of the support member and having an attachment surface configured to couple to an outboard portion of a rotor blade assembly. The adapter further includes an inboard feature extending laterally from the inboard surface of the support member and including a first arm extending laterally from the inboard surface of the support member and having an attachment surface; and a second arm extending laterally from the inboard surface of the support member and having an attachment surface. The outboard feature and the inboard feature are configured such that a plane defined by the attachment surfaces of at least one of the first lug and the second lug is non-parallel to a plane defined by the attachment surfaces of at least one of the first arm and the second arm.

In an embodiment, the first lug, the second lug, the first arm, and the second arm are integral with the support member.

In another embodiment, the attachment surfaces of the first arm and the second arm and the attachment surfaces of the first lug and the second lug are substantially perpendicular.

In yet another embodiment, the attachment surfaces of the first lug and the second lug are configured to be coupled to a spar having an inboard end, an outboard end, and a spar axis extending between the inboard end and the outboard end, and a plane defined by at least one of the attachment surfaces of the first lug and the second lug is substantially parallel to the spar axis.

In still another embodiment, the attachment surfaces of the first arm and second arm are configured to be coupled to one of a portion of a rotor blade assembly and a hub such that rotation of the adapter is permitted about a fold axis, and a plane defined by at least one of the attachment surfaces of the first and second lugs is substantially parallel to the fold axis.

In one embodiment, a plane defined by at least one of the attachment surfaces of the first and second arms of the adapter is substantially perpendicular to the fold axis.

In another embodiment, the adapter is made from one of forged titanium, filament windings, or composite fibers.

Another aspect provides a rotor assembly including a hub; a spar having an inboard end; an outboard end; a first spar cap; and a second spar cap spaced apart from the first spar cap and coupled to the first spar cap by a first curvilinear portion and a second curvilinear portion; and an adapter including a support member having an outboard surface and an inboard surface; an outboard feature extending laterally from the outboard surface of the support member and including a first lug extending laterally from the outboard surface of the support member and having an attachment surface coupled to the first spar cap; and a second lug extending laterally from the outboard surface of the support member and having an attachment surface coupled to the second spar cap; an inboard feature extending laterally from the inboard surface of the support member and including a first arm having an attachment surface coupled a rotor blade assembly; and a second arm having an attachment surface coupled to an inboard portion of a rotor blade assembly. The attachment surfaces of the first and second arms are configured to permit rotation of the adapter about a fold axis. A plane defined by at least one of the attachment surfaces of the first and second arms of the adapter is substantially perpendicular to the fold axis. A plane defined by at least one of the attachment surfaces of the first and second lugs of the adapter is non-perpendicular to the fold axis.

In one embodiment, load-bearing material is positioned within the first spar cap and the second spar cap, where at least 80% of the load-bearing material in the spar is positioned within the first spar cap and the second spar cap.

In another embodiment, the assembly is configured such that the first spar cap and the second spar cap are non-parallel to a plane defined by at least one of the attachment surfaces of the first and second arms of the adapter.

In yet another embodiment, the assembly is configured such that a load on a rotor blade assembly travels in a first direction through the outboard feature of the adapter and travels in a second direction through the inboard feature of the adapter, and the first direction and the second direction are substantially perpendicular.

In still another embodiment, an actuator is coupled to the adapter and configured to rotate the adapter about the fold axis.

In an embodiment, the hub includes a hub axis about which rotor blade assemblies are configured to rotate, and where the hub axis and the fold axis are substantially parallel.

In another embodiment, the assembly is configured to be coupled to a tiltrotor aircraft.

In still another embodiment, the assembly is configured to enable the adapter to rotate about the fold axis by at least 90 degrees in either direction.

Still another aspect provides a tiltrotor aircraft rotor assembly including a hub having a hub axis about which rotor blade assemblies rotate; a plurality of rotor blade assemblies; and a hinge between the hub and at least one of the plurality of rotor blade assemblies, the hinge having a fold axis about which at least a portion of the at least one of the plurality of rotor blade assemblies is permitted to fold. The hub axis and the fold axis are substantially parallel.

In another embodiment, at least a portion of the at least one of the plurality of rotor blade assemblies can rotate about the fold axis by equal to or greater than 90 degrees in either direction.

In yet another embodiment, each rotor blade assembly includes an inboard end and an outboard end, the assembly further including load-bearing material positioned within at least one of the plurality of rotor blade assemblies such that at least 80% of the load-bearing material is substantially parallel to the fold axis, and such that at least 80% of the load-bearing material is substantially perpendicular to a direction of rotation of the rotor blade assembly.

In still another embodiment, the assembly includes an adapter having a support member having an outboard surface and an inboard surface; an outboard feature extending laterally from the outboard surface of the support member and coupled to the rotor blade assembly, the outboard feature having at least one lug having at least one attachment surface adjacent to the rotor blade assembly; and an inboard feature extending laterally from the outboard surface of the support member and coupled to an inboard portion of a rotor blade assembly to form the hinge, the inboard feature having at least one arm having at least one attachment surface adjacent to the inboard portion of a rotor blade assembly that is substantially perpendicular to the fold axis. A plane defined by the at least one attachment surface of the at least one lug is non-parallel to a plane defined by the at least one attachment surface of the at least one arm.

In one embodiment, a plane defined by the at least one attachment surface of the at least one lug intersects a plane defined by the at least one attachment surface of the at least one arm to define an angle of at least 15 degrees.

In another embodiment, each of the rotor blade assemblies includes a spar having an inboard end; an outboard end; a first spar cap; and a second spar cap spaced apart from the first spar cap and coupled to the first spar cap by a first curvilinear portion and a second curvilinear portion. The at least one lug is coupled to the first spar cap and the second spar cap.

In yet another embodiment, the assembly is configured such that a load on each rotor blade assembly travels in a first direction through the outboard feature of the adapter and travels in a second direction through the inboard feature of the adapter, and the first direction and the second direction are non-parallel.

In still another embodiment, the assembly includes one or more leading edge fairings coupled to a portion of the rotor blade assembly; and one or more trailing edge fairings coupled to a portion of the rotor blade assembly. The at least one of the plurality of rotor blade assemblies is permitted to fold without removal of the one or more leading edge fairings and the one or more trailing edge fairings.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatuses and methods are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

Figure 1:
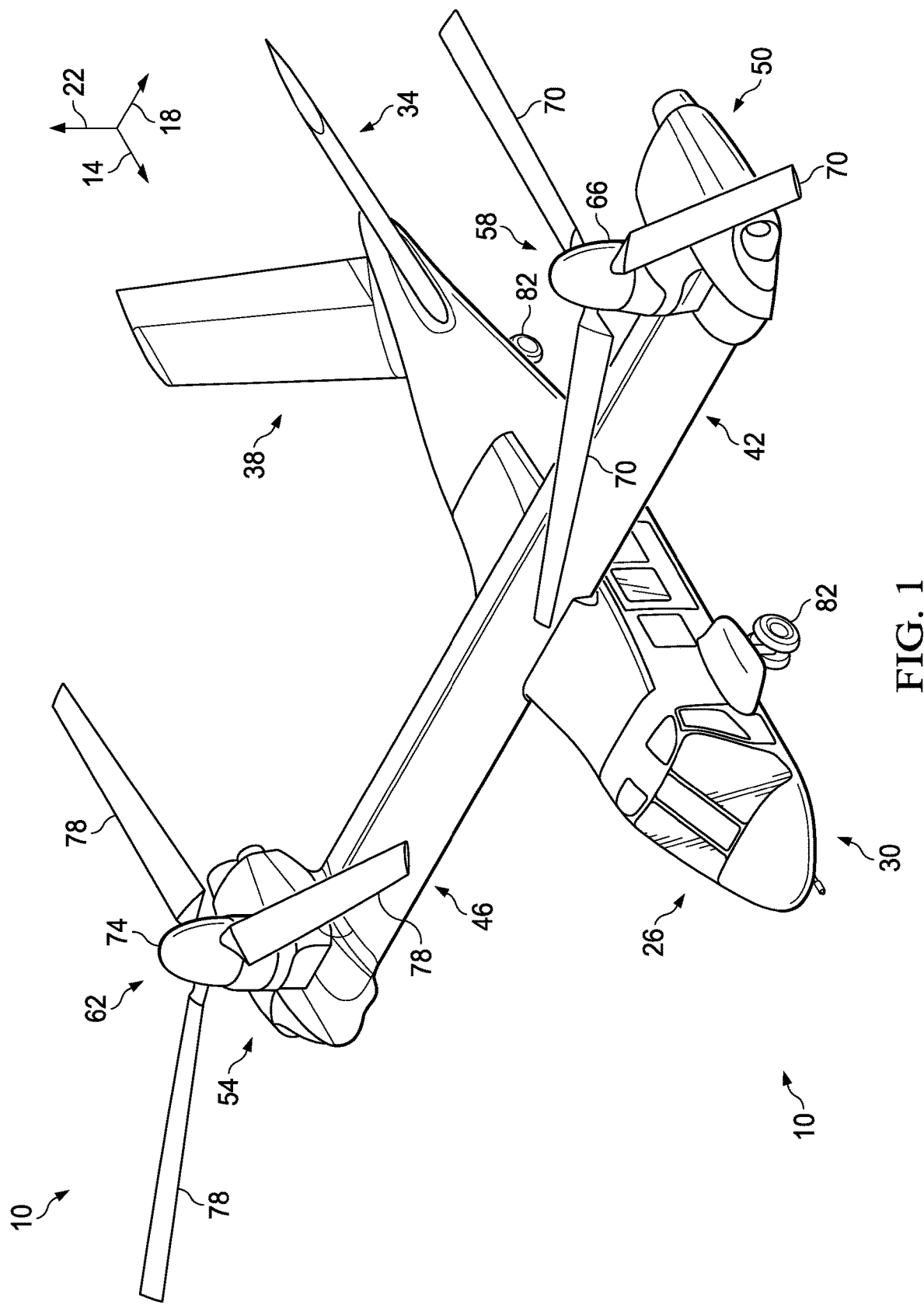
FIG. 1 is a perspective view of an aircraft, according to one example embodiment.
Figure 2:
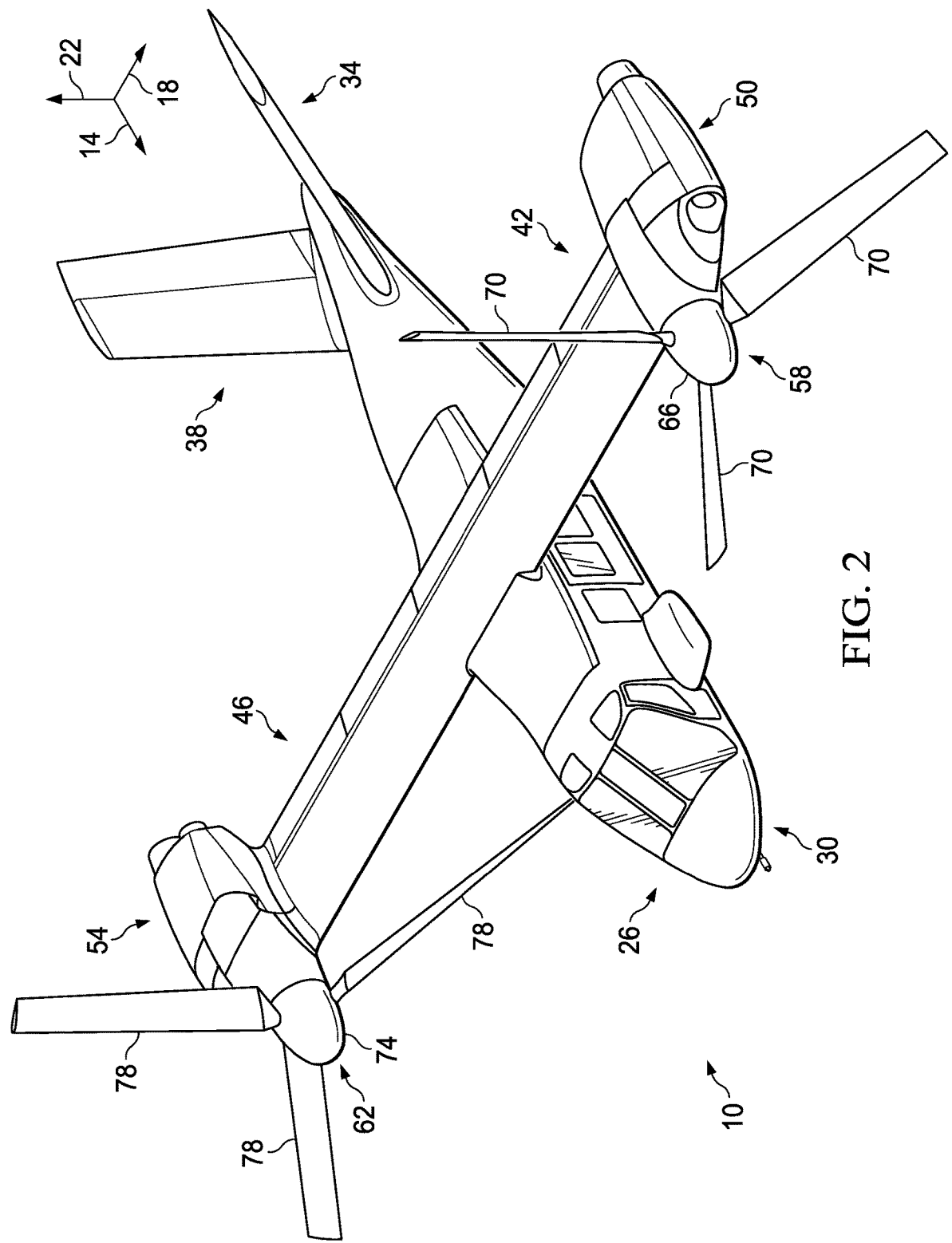
FIG. 2 is another perspective view of an aircraft, according to one example embodiment.

FIGS. 1-2 depict aircraft 10 as a tiltrotor aircraft. FIGS. 1-2 depict three mutually orthogonal directions X, Y, and Z forming a three-dimensional frame of reference XYZ. Longitudinal axis X 14 corresponds to the roll axis that extends through the center of aircraft 10 in the fore and after directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66. Similarly, rotor assembly 62 includes rotor hub 74 and plurality of rotor blades 78 extending from rotor hub 74. Each of rotor assemblies 58 and 62 can, for example, be coupled to and controlled with an engine and gearbox connected to a driveshaft, such as one continuous driveshaft extending from propulsion system 50 to propulsion system 54 or a segmented driveshaft separated by a gearbox.

Rotor assemblies 58 and 62 are controllable and positionable to, for example, enable control of direction, thrust, and lift of aircraft 10. For example, FIG. 1 illustrates aircraft 10 in a first configuration, in which propulsion systems 50 and 54 are positioned to provide a lifting thrust to aircraft 10, if activated. In the embodiment shown in FIG. 1, propulsion systems 50 and 54 are positioned such that, if activated, aircraft 10 moves substantially in the Z direction ("helicopter mode"). In the embodiment shown in FIG. 1, aircraft 10 further includes landing gear 82 with which aircraft 10 can contact a landing surface.

FIG. 2 illustrates aircraft 10 in a second configuration, in which propulsion systems 50 and 54 are positioned to provide a forward thrust to aircraft 10, if activated. In the embodiment shown in FIG. 2, propulsion systems 50 and 54 are positioned such that, if activated, aircraft 10 moves substantially in the X direction ("airplane mode"). In the second configuration depicted in FIG. 2, wings 42 and 46 enable a lifting thrust to be provided to aircraft 10. Wings 42 and 46 can be configured to increase the wing span and wing aspect ratio, which thereby increases lift/draft ratio, aircraft efficiency, and fuel economy. Though not depicted in FIGS. 1-2, propulsion systems 50 and 54 can be controllably positioned in helicopter mode, airplane mode, or any position between helicopter mode and airplane mode to provide for a desired direction, thrust, and/or lift.

FIGS. 3-14B depict one or more rotor assemblies and components thereof. Any rotor assembly or component thereof depicted in FIGS. 3-14B and/or described herein can be used in combination with aircraft 10 depicted in FIGS. 1-2 to operate as described. Additionally, the rotor assemblies and components thereof depicted in FIGS. 3-14B and/or described herein can be used with any aircraft configured or configurable to include one or more rotor assemblies, including helicopters, tilt wing aircrafts, unmanned aerial vehicles (UAVs), and other vertical lift aircrafts, or can further be used with any device configured or configurable to include a rotor blade, including devices with propellers, windmills, and wind turbines. Further, any features of one embodiment of the one or more rotor assemblies or components thereof in this disclosure can be used with any other embodiment of the one or more rotor assemblies or components thereof in this disclosure such that the other embodiment has the same or similar features, operates in the same or similar way, or achieves the same or similar functions.

Figure 3:
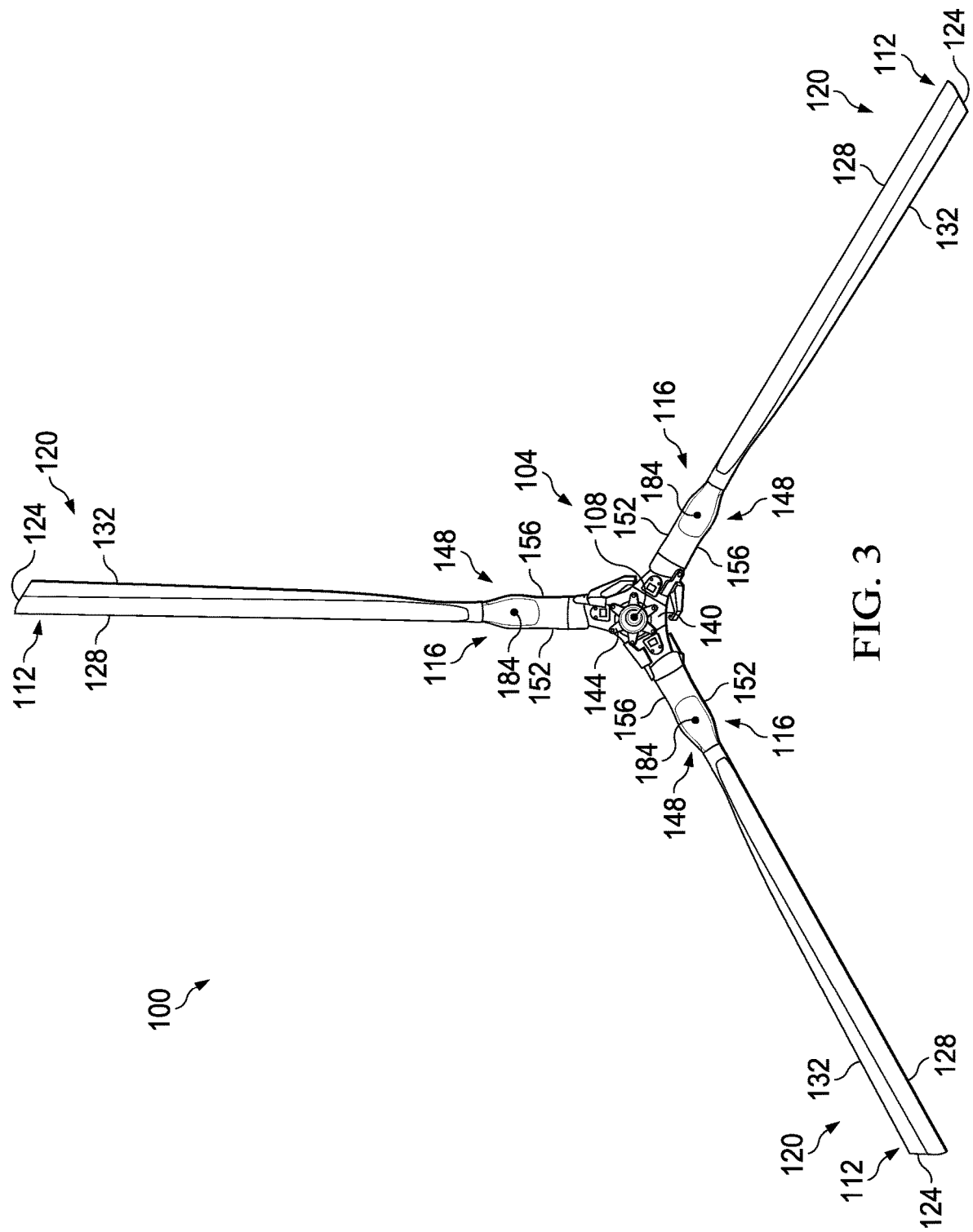
FIG. 3 is a top view of rotor assembly in an unfolded configuration, according to one example embodiment.
Figure 4:
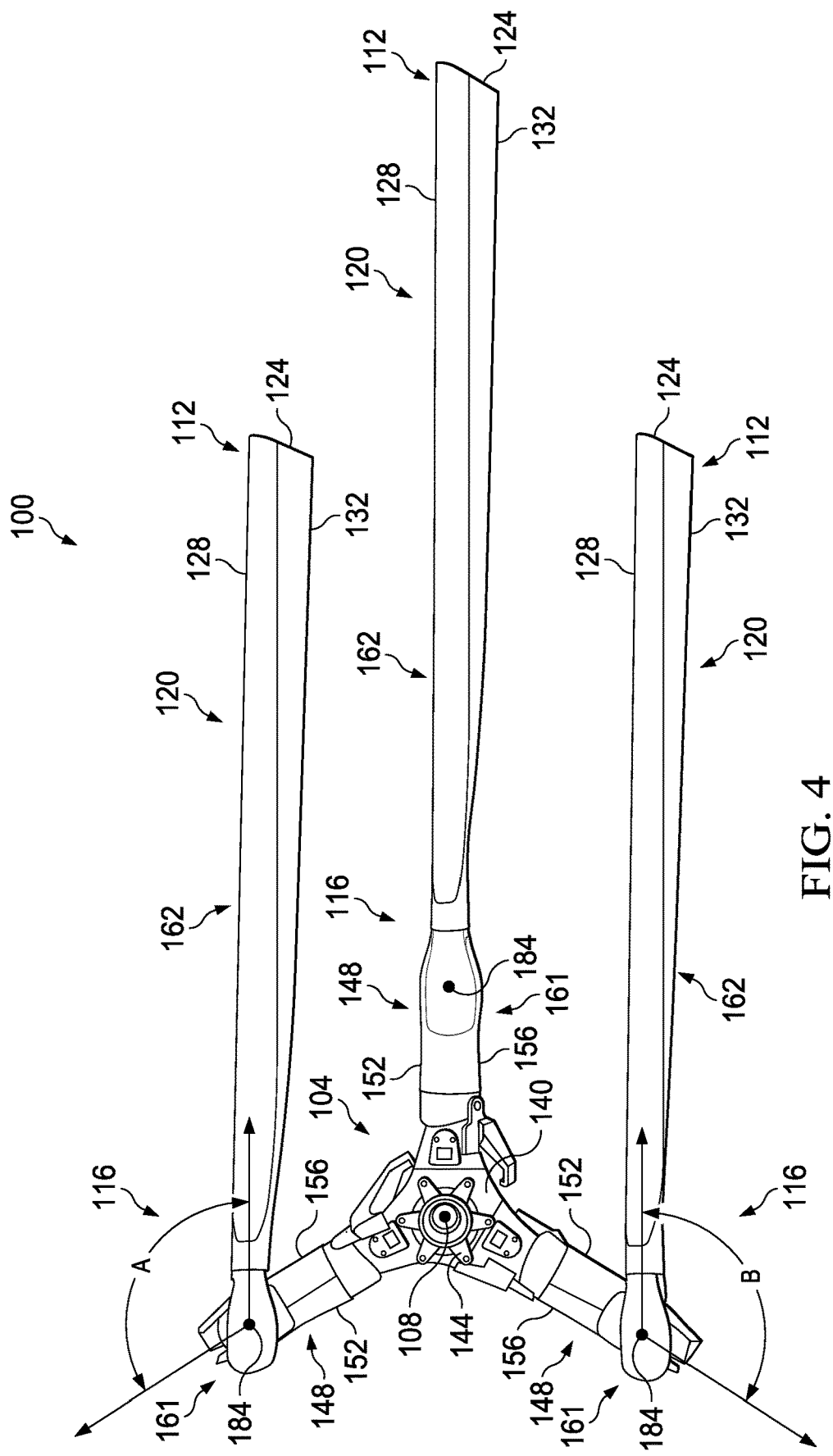
FIG. 4 is a top view of a rotor assembly in a folded configuration, according to one example embodiment.
Figure 5:
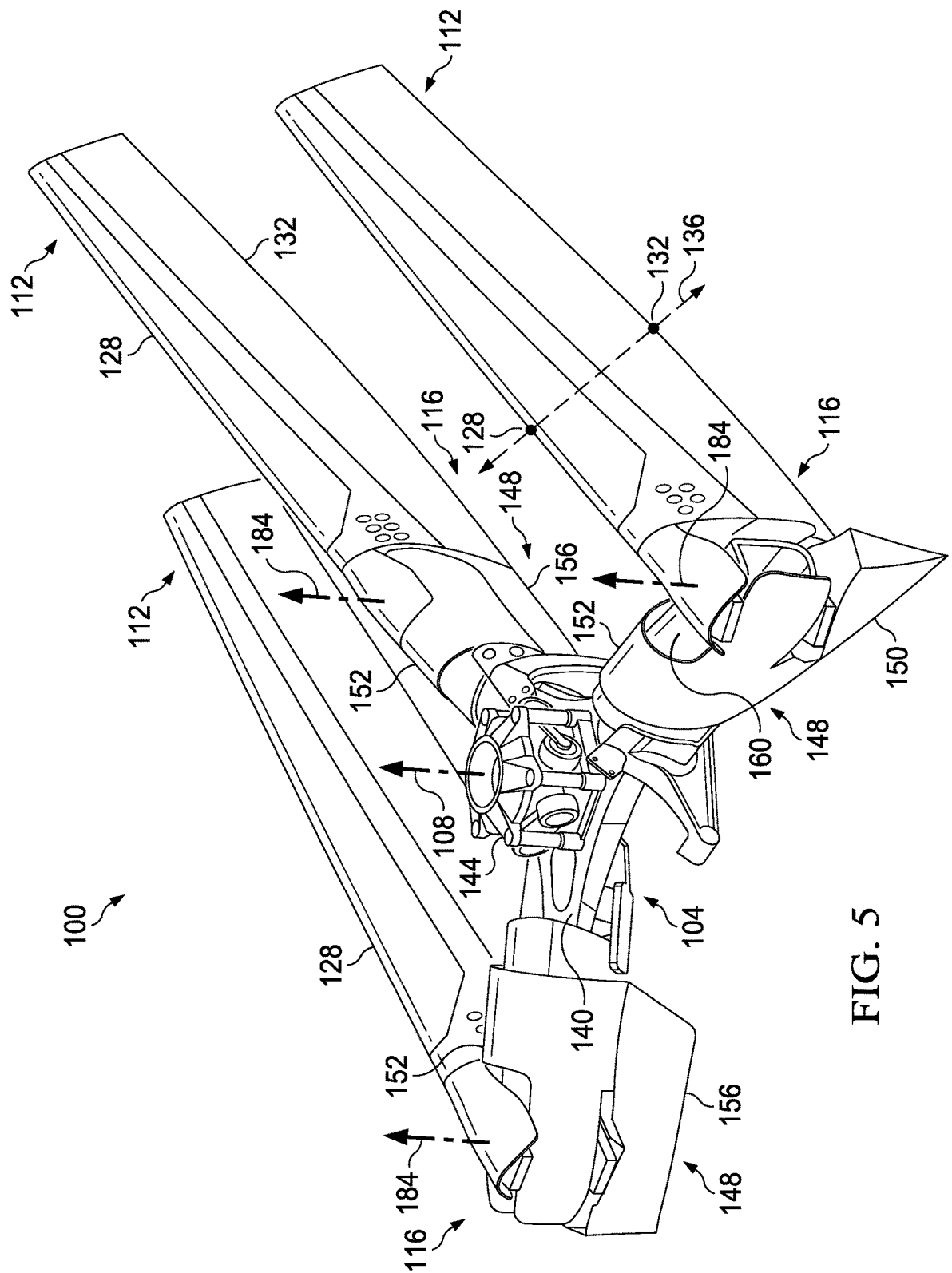
FIG. 5 is a perspective view of a portion of the rotor assembly of FIG. 4; according to one exemplary embodiment.
Figure 6:
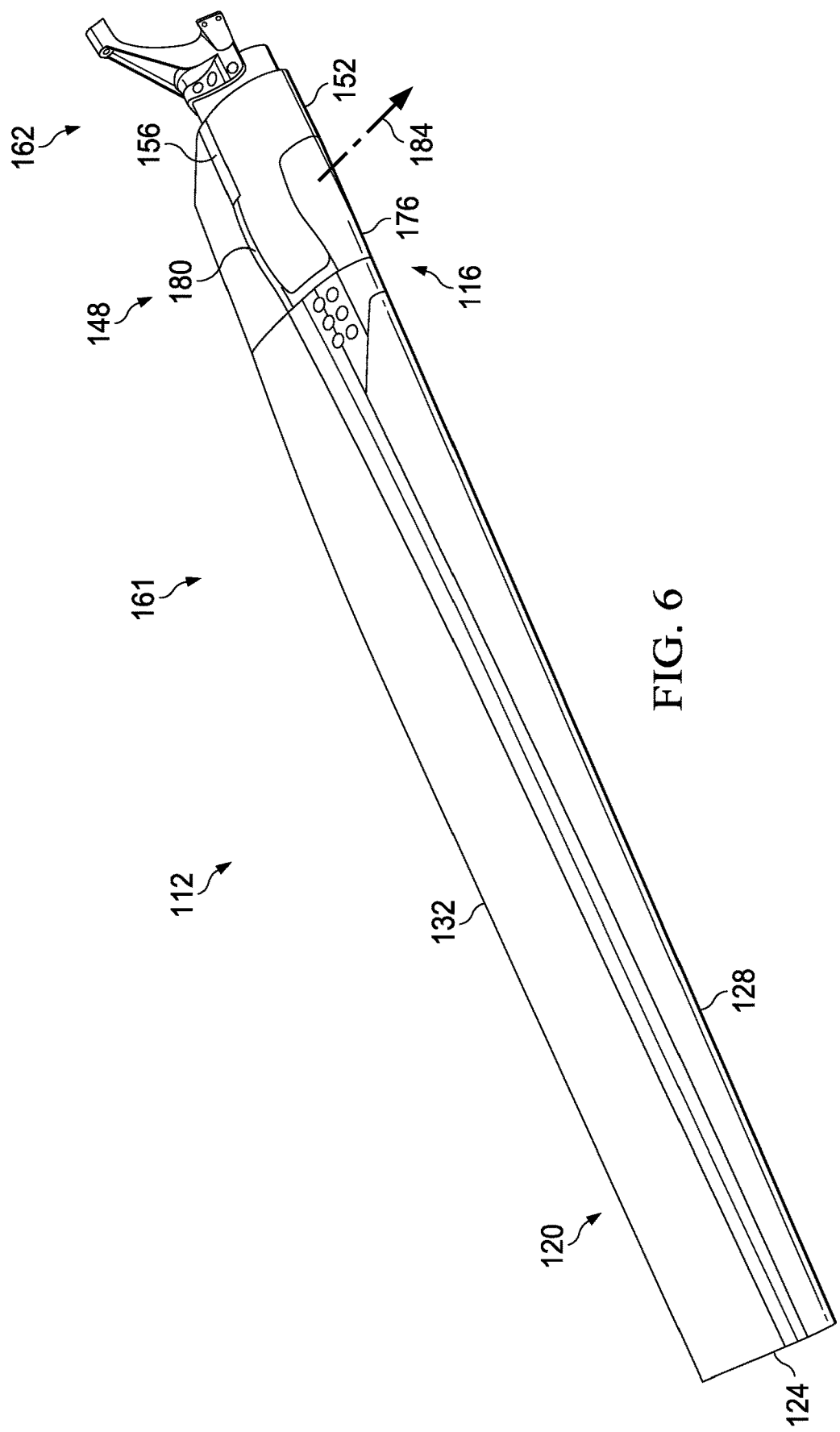
FIG. 6 is a perspective view of a rotor blade assembly, according to one example embodiment.
Figure 7:
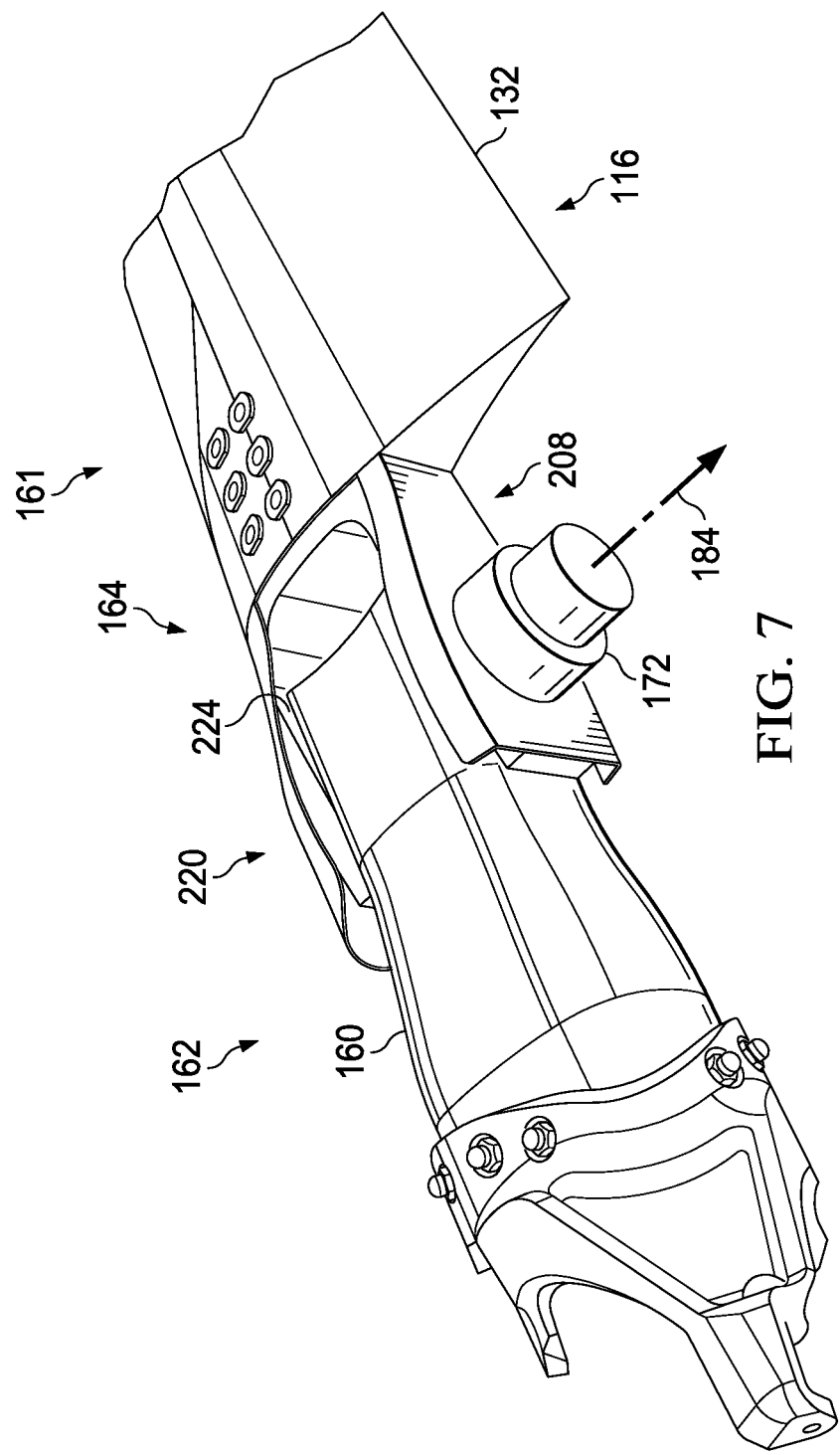
FIG. 7 is a perspective view of a portion of a rotor blade assembly, according to one example embodiment.

FIGS. 3-5 depict rotor assembly 100. In the embodiment shown, rotor assembly 100 includes rotor hub 104 having hub axis 108. If rotor assembly 100 is coupled to a tiltrotor aircraft as described in FIGS. 1-2, and if the tiltrotor aircraft is in helicopter mode, hub axis 108 is substantially parallel to vertical axis Z 22. If rotor assembly 100 is coupled to a tiltrotor aircraft as described in FIGS. 1-2, and if the tiltrotor aircraft is in airplane mode, hub axis 108 is substantially parallel to longitudinal axis X 14.

In the embodiment shown in FIGS. 3-5, plurality of rotor blade assemblies 112 are couplable (and are depicted as coupled in the embodiment shown) to hub 104. Hub 104 is couplable to one or more engines (mechanically and electrically) to enable the engine, if activated, to transfer energy to hub 104 and into plurality of rotor blade assemblies 112 to enable plurality of rotor blade assemblies 112 to rotate about hub axis 108. Each of rotor blade assemblies 112 includes inboard portion 116, which is coupled to hub 104, and outboard portion 120 extending outward from hub 104 and ending in blade tip 124. Each of rotor blade assemblies 112 further includes leading edge 128 and trailing edge 132, and chordwise axis 136 passing through leading edge 128 and trailing edge 132. Hub 104 includes yoke 140 and hub plate 144, each of which is coaxial with hub axis 108. Each of rotor blade assemblies 112 includes grip assembly 148 that is couplable (and is depicted as coupled in the embodiment shown) to hub 104 via yoke 140 to enable energy to transfer from hub 104 to each of rotor blade assemblies 112. Each grip assembly 148 includes leading edge grip fairing 152, trailing edge grip fairing 156, and grip 160, where leading edge grip fairing 152 and trailing edge grip fairing 156 act to provide protection to grip 160 and to maintain aerodynamic properties of each rotor blade assembly 112, among other things. Mechanical and electrical interconnections may be required or desirable to couple hub 104 to each of rotor blade assemblies 112, such as those that may be required or desirable to have mechanically and electrically powered components in space-constrained locations.

Figure 8:
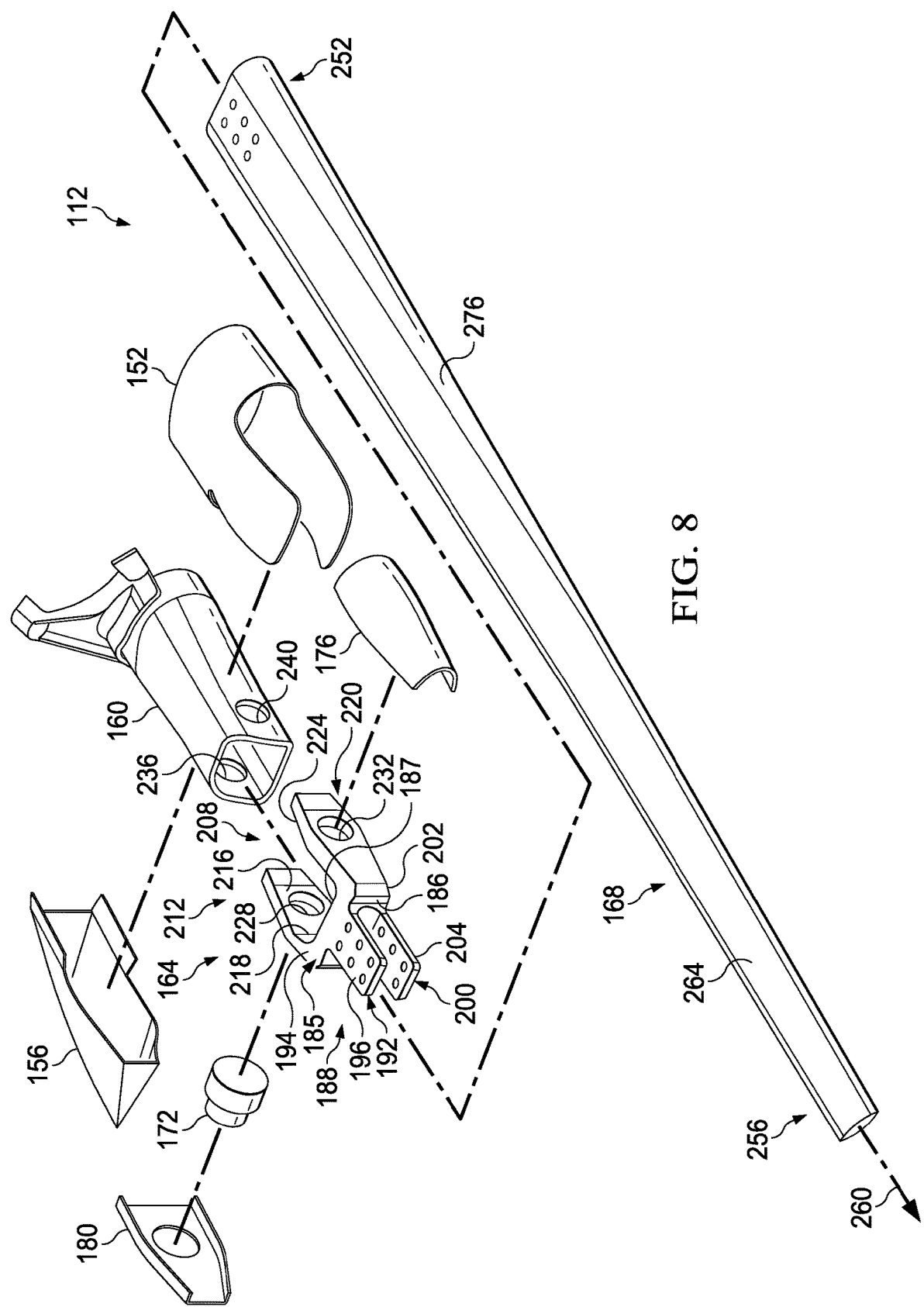
FIG. 8 is an exploded view of a portion of a rotor blade assembly, according to one example embodiment.
Figure 9:
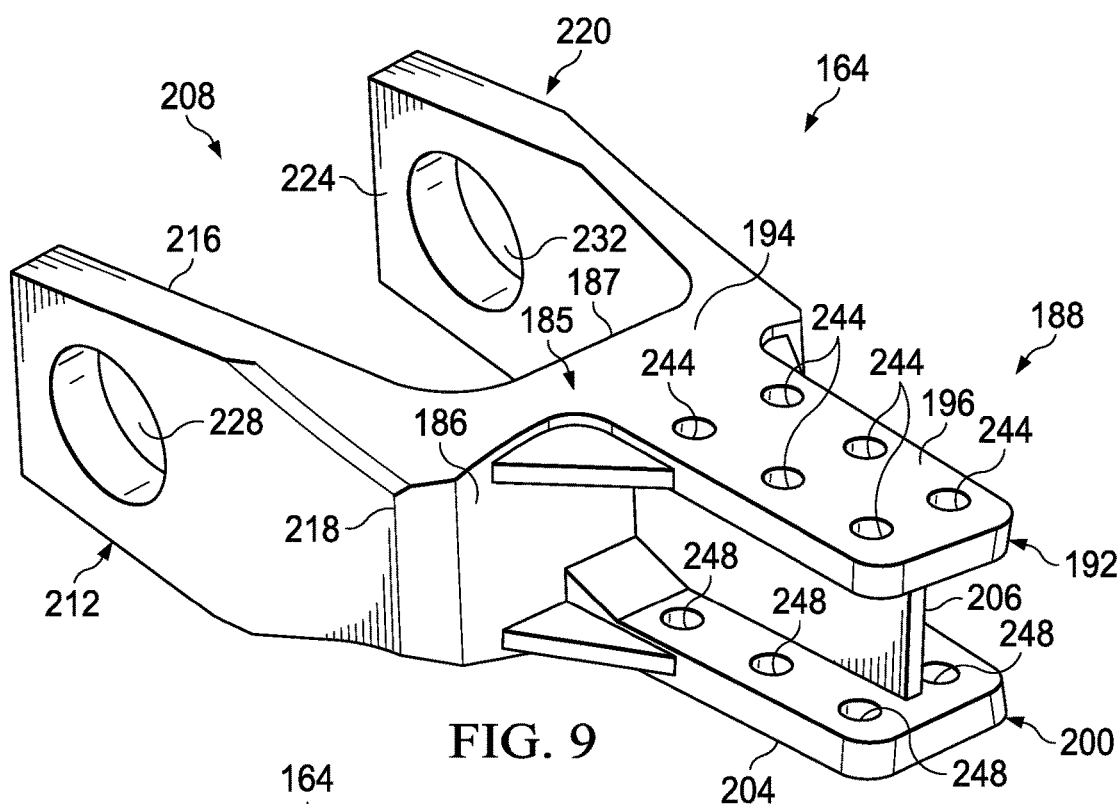
FIG. 9 is a perspective view of an adapter that can be used with a rotor assembly, according to one example embodiment.
Figure 10:
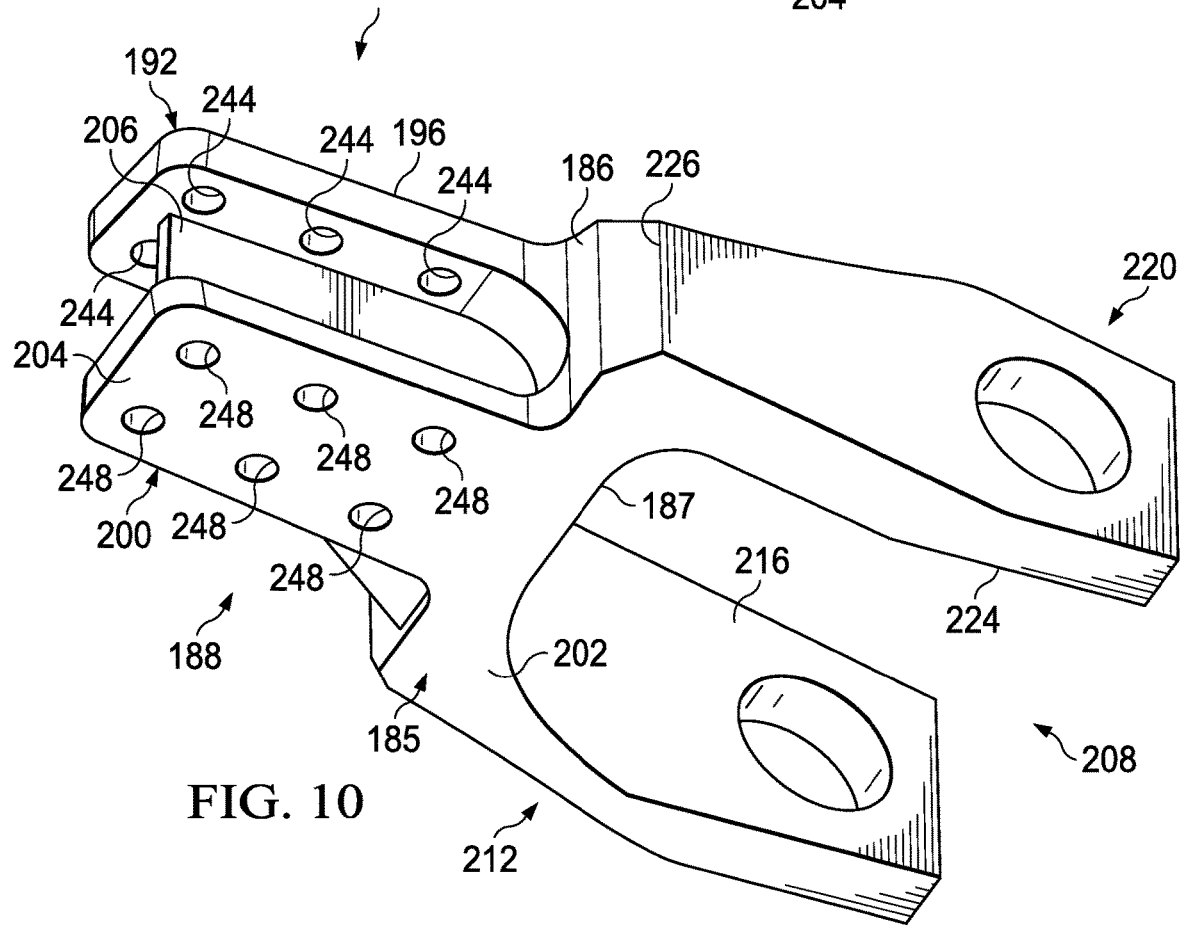
FIG. 10 is another perspective view of the adapter of FIG. 9.

Each of rotor blade assemblies 112 depicted in FIGS. 3-6 are foldable. For example, each of rotor blade assemblies includes a foldable portion 161 and a non-foldable portion 162. FIGS. 7-14B provide further views of portions of rotor blade assemblies 112 to illustrate features that enable plurality of rotor blade assemblies 112 to fold. As depicted in FIG. 8, each of rotor blade assemblies 112 further includes adapter 164, spar 168, fold actuator 172, leading edge adapter fairing 176, and trailing edge adapter fairing 180, where leading edge adapter fairing 176 and trailing edge adapter fairing 180 act to provide protection to adapter 164 and to maintain aerodynamic properties of each rotor blade assembly 112, among other things.

Figure 13:
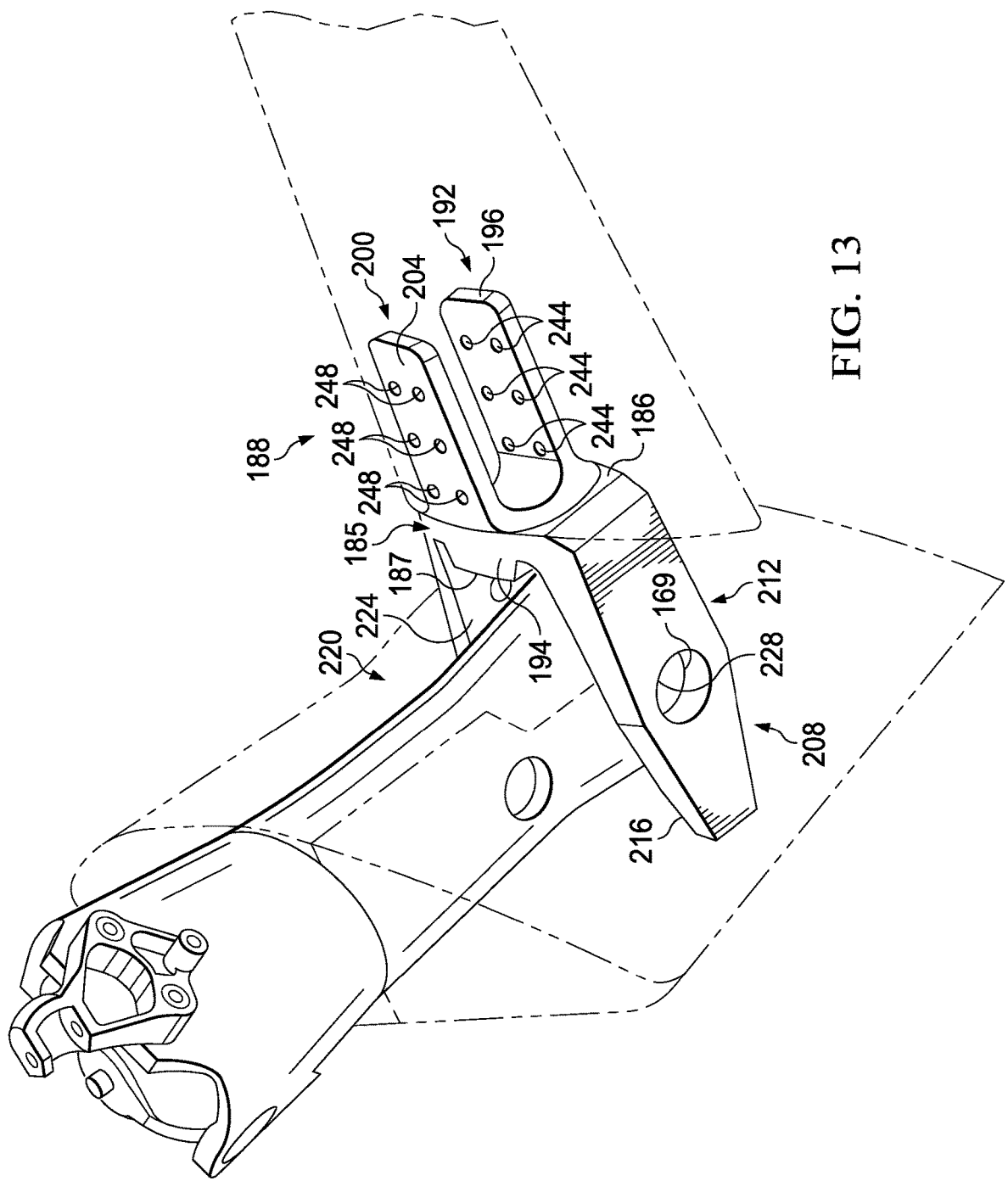
FIG. 13 is a perspective view of a portion of a rotor blade assembly in a folded configuration, according to one example embodiment.

For each rotor blade assembly 112, grip 160 is coupled to adapter 164 at hinge 169 such that adapter 164 (and, thus, foldable portion 161 of rotor blade assembly 112) can rotate about fold axis 184, as depicted in detail in FIG. 13. In some embodiments, adapter 164 (and, thus, foldable portion 161 of rotor blade assembly 112) can rotate about fold axis 184 by equal to or greater than 90 degrees in either direction (e.g., 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, or 180 degrees). In some embodiments, adapter 164 can rotate about fold axis 184 by less than 90 degrees and/or in only one direction. For example, as depicted in FIG. 3, rotor assembly 100 can include an operating configuration in which each of plurality of rotor blade assemblies 112 is unfolded (e.g., adapter 164 corresponding to each rotor blade assembly 112 is un-rotated about fold axis 184). In such an example, as depicted in FIGS. 4-5, rotor assembly 100 can include a stowed configuration in which one or more (two, in the embodiment shown) rotor blade assemblies 112 is folded (e.g., adapter 164 corresponding to each rotor blade assembly 112 is rotated about fold axis 184) to define a fold axis 184 angle with respect to its unfolded position (e.g., Angle A and Angle B depicted in FIG. 4, both of which can be equal or unequal). In some embodiments, the fold axis 184 angle is an acute angle; and, in other embodiments, the fold axis 184 angle is a non-acute angle. In the stowed configuration, one or more rotor blade assemblies 112 can be folded to any suitable configuration. In an embodiment, such as the configuration depicted in FIGS. 4-5, two rotor blade assemblies 112 are folded such that foldable portion 161 of the rotor blade assemblies 112 is generally parallel with at least a portion of the other rotor blade assembly 112, e.g. Angles A and B are substantially equal and symmetrical. In such an example, adapter 164 corresponding to each folded rotor blade assembly 112 has been rotated about corresponding axis 184 by approximately 120 degrees in opposite directions. In other embodiments, the unfolded rotor blade assembly 112 depicted in FIGS. 4-5 can be folded (e.g., to define an angle with respect to its unfolded position, as described above) and/or one or more of the folded blades 112 depicted in FIGS. 4-5 can be unfolded.

In the embodiment shown in FIGS. 3-6, fold axis 184 is substantially parallel to hub axis 108. Furthermore, fold axis 184 can be collinear with chordwise axis 136 at one position on each of rotor blade assemblies 112, where leading edge 128 of each rotor blade assembly 112 corresponds to leading edge adapter fairing 152, and trailing edge 132 of each rotor blade assembly 112 corresponds to trailing edge adapter fairing 156. Fold actuator 172 is mechanically and electrically coupled at hinge 169 to facilitate rotation of adapter 164 (and, thus, foldable portion 161 of rotor blade assembly 112 to which adapter 164 is coupled) about fold axis 184. Fold actuator 172 can include, for example, a planetary gear drive fold actuator actuated through a fold pin assembly. As another example, fold actuator 172 can include a planetary gear drive and a pin having an interior motor configured to drive the planetary gear drive to facilitate rotation of adapter 164 about fold axis 184. Fold actuator 172 can be a variety of suitable actuation devices and can facilitate rotation of a portion of each rotor blade assembly 112 through mechanical and electrical coupling of a variety of features in rotor assembly 100. In the embodiment shown, each of rotor blade assemblies 112 can be folded without removing leading edge grip fairing 152, trailing edge grip fairing 156, leading edge adapter fairing 152, and trailing edge adapter fairing 176; however, in other embodiments, one or more of leading edge grip fairing 152, trailing edge grip fairing 156, leading edge adapter fairing 152, and trailing edge adapter fairing 176 can be removed to facilitate folding of each of rotor blade assemblies 112.

In an embodiment in which rotor assembly 100 is coupled to a tiltrotor aircraft, such as that depicted in FIGS. 1-2, hub axis 108, fold axes 184, and vertical axis Z 22 are substantially parallel, when the tiltrotor aircraft is in helicopter mode, and hub axis 108, fold axes 184, and longitudinal axis X 14 are substantially parallel, when the tiltrotor aircraft is in airplane mode. In such an embodiment, hub axis 108, fold axes 184, and vertical axis Z 22 are substantially perpendicular to the X-Y plane, when the tiltrotor aircraft is in helicopter mode, and substantially perpendicular to the Y-Z plane, when the tiltrotor aircraft is in airplane mode. In such an embodiment, a portion of each rotor blade assembly 112 (e.g., foldable portion 161) can fold about fold axes 184 substantially within the X-Y plane, when the tiltrotor aircraft is in helicopter mode, and substantially within the Y-Z plane, when the tiltrotor aircraft is in airplane mode. In some embodiments in which rotor assembly 100 is coupled to a tiltrotor aircraft and the tiltrotor aircraft is in helicopter mode, rotor assembly 100 can be configured such that fold axes 184 are non-parallel to hub axis 108 and vertical axis Z 22, and a portion of each rotor blade assembly 112 (e.g., foldable portion 161) can fold about fold axis 184 and not within the X-Y plane (e.g., with fold axes 184 intersecting the X-Y plane at an angle of 1 degree, 2 degrees, 3 degrees, 4 degrees, 5 degrees, 10 degrees or more). Similarly, in some embodiments in which rotor assembly 100 is coupled to a tiltrotor aircraft and the tiltrotor aircraft is in airplane mode, rotor assembly 100 can be configured such that fold axes 184 are non-parallel to hub axis 108 and longitudinal axis X 22 such that a portion of each rotor blade assembly 112 (e.g., foldable portion 161) can fold about fold axis 184 and not within the X-Y plane (e.g., with fold axes 184 intersecting the X-Y plane at an angle of 1 degree, 2 degrees, 3 degrees, 4 degrees, 5 degrees, 10 degrees or more).

One or more features of adapter 164 and spar 168 assist in enabling the folding configurations described above. FIGS. 7-14B depict various embodiments of adapter 164. Adapter 164 includes support member 185, which has outboard surface 186 and inboard surface 187. In the embodiment shown, adapter 164 further includes outboard feature 188 extending laterally from outboard surface 186 of support member 185. Outboard feature 188 includes a first outboard lug 192 having attachment surface 196, which is configured to be coupled to an inboard portion 116 of a rotor blade assembly (e.g., foldable portion 161 and, more specifically, spar 168). Outboard lug 192 extends laterally from the top surface 194 of support member 185. In the embodiment shown, attachment surface 196 of outboard lug 192 is substantially perpendicular to support member 185. Outboard feature 188 further includes a second outboard lug 200 having attachment surface 204, which is configured to be coupled to an inboard portion 116 of a rotor blade assembly (e.g., foldable portion 161 and, more specifically, spar 168). Outboard lug 200 extends laterally from bottom surface 202 of support member 185.

In the embodiment shown, attachment surface 204 of outboard lug 200 is substantially perpendicular to support member 185. In some embodiments, such as those depicted in FIGS. 9-10, outboard feature 188 of adapter 164 further includes support structure 206 extending between outboard lug 192 and outboard lug 200. Adapter 164 can include support structure 206 to, for example, provide additional structural support to adapter 164 (e.g., to discourage or prevent outboard lug 192 and outboard lug 200 from moving with respect to each other), to reduce weight (e.g., enabling the removal of material in other portions of adapter 164), or for other structural purposes. In other embodiments, outboard feature 188 includes less than two outboard lugs or more than two outboard lugs while still enabling outboard feature 188 of adapter 164 to have one or more attachment surfaces in accordance with this disclosure.

Adapter 164 further includes inboard feature 208 extending laterally from inboard surface 187 of support member 185. Inboard feature 208 includes a first inboard arm 212 having attachment surface 216, which is configured to be coupled to a portion of a rotor blade assembly (e.g., non-foldable portion 162 and, more specifically, grip assembly 148)), a hub (e.g., rotor hub 104 or a portion thereof), or both. Inboard arm 212 extends laterally from exterior side 218 of support member 185. In the embodiment shown, attachment surface 216 of inboard arm 212 is substantially perpendicular to support member 185. Inboard feature 208 further includes a second inboard arm 220 having attachment surface 224, which is configured to be coupled to a portion of a rotor blade assembly (e.g., non-foldable portion 162 and, more specifically, grip assembly 148), a hub (e.g., rotor hub 104 or a portion thereof), or both. Inboard arm 220 extends laterally from exterior side 226 of support member 185. In the embodiment shown, attachment surface 224 of inboard arm 220 is substantially perpendicular to support member 185. In other embodiments, inboard feature 208 includes less than two inboard arms or more than two inboard arms while still enabling inboard feature 208 of adapter 164 to have one or more attachment surfaces in accordance with this disclosure.

In the embodiments shown, outboard lugs 192 and 200 each extends partially, but not fully, between exterior side 218 and exterior side 226 of support member 185. However, in other embodiments, outboard lugs 192 and 200 can extend from exterior side 218 to exterior side 226 of support member 185. Further, in the embodiment shown, inboard arms 212 and 220 each extends from top surface 194 to bottom surface 202 of support member 185. However, in other embodiments, inboard arms 212 and 220 can each extend partially, but not fully, between top surface 194 and bottom surface 202 of support member 185.

In the embodiments shown in FIGS. 7-14B, adapter 164 is configured such that attachment surfaces 196 and 204 of outboard lugs 192 and 200, respectively, are non-parallel to attachment surfaces 216 and 224 of inboard arms 212 and 220, respectively. For example, in the embodiment shown, a plane defined by attachment surface 196 and attachment surface 204 are substantially parallel to each other, and a plane defined by attachment surface 216 and attachment surface 224 are substantially parallel to each other. Furthermore, the planes defined by attachment surfaces 196 and 204 are non-parallel to the planes defined by attachment surfaces 216 and 224. In the embodiment shown, the planes defined by attachment surfaces 196 and 204 are substantially perpendicular to the planes defined by attachment surfaces 216 and 224; however, in other embodiments, the planes defined by attachment surfaces 196 and 204 are non-perpendicular to the planes defined by attachment surfaces 216 and 224 (e.g., the planes defined by attachment surfaces 196 and 204 intersect with the planes defined by attachment surfaces 216 and 224 to define an angle between 0 and 90 degrees, such 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, 5 degrees, or less).

Figure 11:
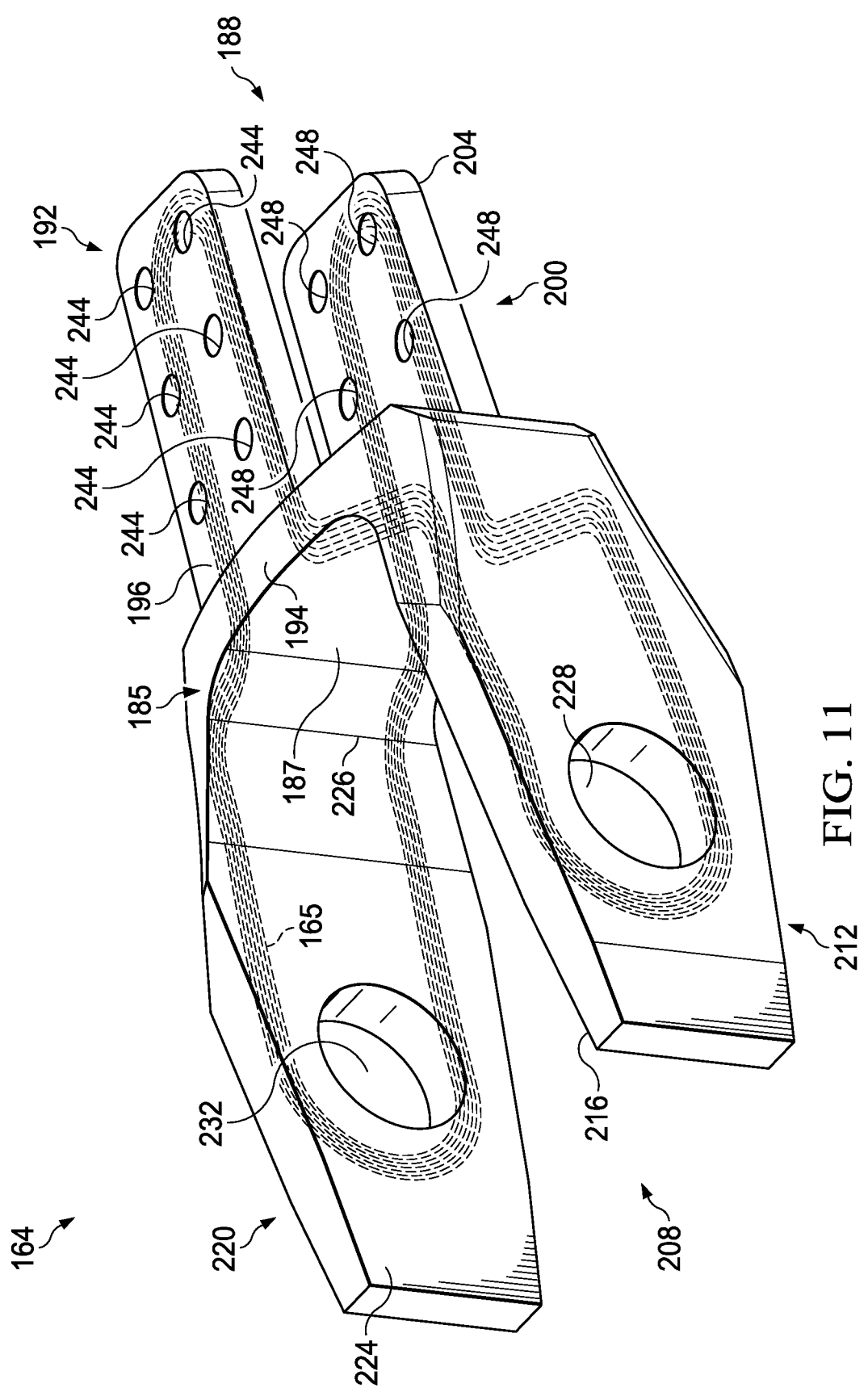
FIG. 11 is a perspective view of an adapter that can be used with a rotor assembly, according to one example embodiment.
Figure 12:
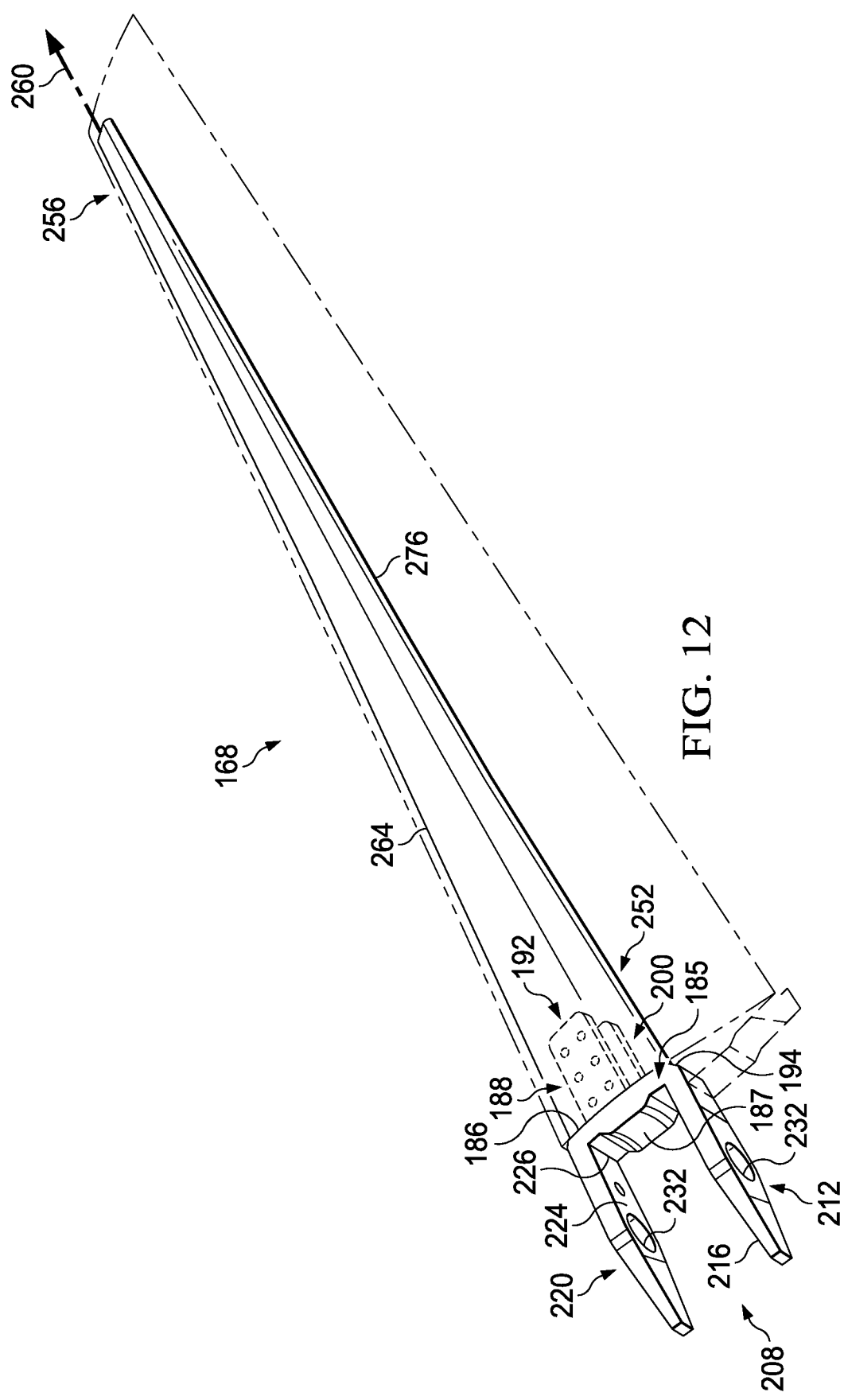
FIG. 12 is a perspective view of a portion of a rotor blade assembly in an unfolded configuration, according to one example embodiment.

In the embodiment shown, outboard feature 188 (and, more specifically, outboard lugs 192 and 200) are integral with support member 185. In the embodiment shown, inboard feature 208 (and, more specifically, inboard arms 212 and 220 are integral with support member 185. However, in other embodiments, outboard feature 188 and inboard feature 208 can be coupled in any manner to substantially prevent relative motion therebetween. Adapter 164 and can be formed, for example, by forging a suitable metal or composite material (e.g., forged Titanium), by casting a suitable metal or composite material, by machining a suitable metal or composite material, by a closed cavity mold, and by fabricating using a filament winding or composite fiber placement (e.g., as depicted in FIG. 11, which shows one example of a reinforcement path 165). The reinforcement path 165 depicted in FIG. 11 is illustrative to demonstrate a reinforcement path for fiber placement and composite construction, and, in practice, such materials are incorporated into or on adapter 164. In an embodiment, the adapter 164 can be made of a fiber-reinforced, polymeric, composite material, such as a carbon-reinforced epoxy material, a non-epoxy resin system, an aramid fiber, a fiberglass-reinforced epoxy material, or a thermo-plastic resin system. A fiber reinforced adapter 164 can be formed with any process, including, for example, tape-placement, fiber placement, filament-winding, braiding, and resin transfer molding (RTM), hand layup, or the like.

As previously disclosed, inboard feature 208 is configured to be coupled to at least one of an inboard portion of a rotor blade assembly (e.g., grip assembly 148 and/or another component configured to couple adapter 164 to a rotor hub) and a hub (e.g., rotor hub 104 or a portion thereof). In the embodiment shown, inboard arm 212 includes opening 228 extending through attachment surface 216, and inboard arm 220 includes opening 232 extending through attachment surface 224. Grip 160 further includes openings 236 and 240 extending through a portion thereof. Grip 160 and inboard feature 208 are positioned such that openings 228 and 232 of inboard arms 212 and 220, respectively, align with openings 236 and 240 of grip 160, respectively, to enable a coupling device (e.g., fold actuator 172 at hinge 168, in the embodiment shown) to extend through openings 228 and 232 of inboard arms 212 and 220, respectively, and openings 236 and 240 of grip 160 to couple inboard feature 208 to grip 160. For example, fold actuator 172 can include a pin with a motor interior to the pin, and the pin can extend through openings 228 and 232 of inboard arms 212 and 220, respectively, and openings 236 and 240 of grip 160 to couple inboard feature 208 to grip 160. Openings 228 and 232 of inboard arms 212 and 220, respectively, and openings 236 and 240 of grip 160 are coaxial with fold axis 184 to enable inboard feature 208 (and, therefore, adapter 164, as depicted in FIG. 13) to rotate about fold axis 184 with respect to grip 160. In the embodiment shown, each of the planes defined by attachment surfaces 216 and 224 of inboard feature 208 are substantially perpendicular to fold axis 184. Inboard feature 208 can similarly be coupled to other portions of a rotor blade assembly or a hub in the same or similar configurations to enable rotation of adapter 164 about a fold axis of rotation.

Figure 14A:
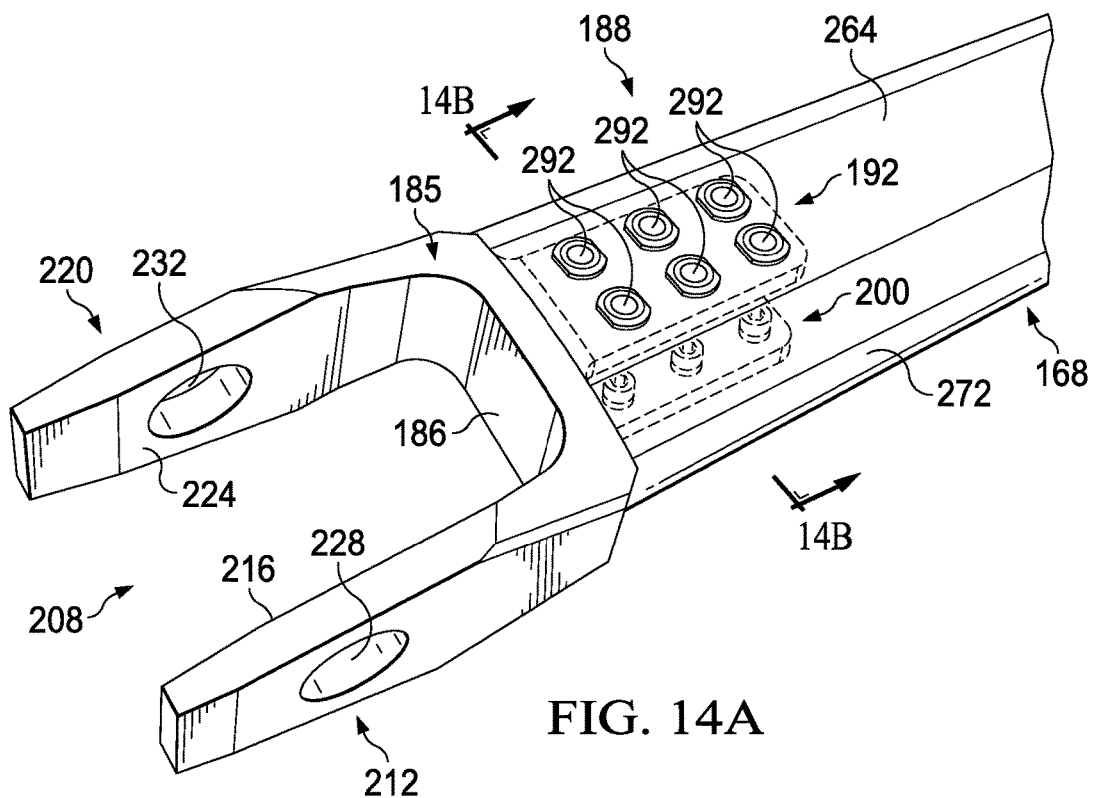
FIG. 14A is a perspective view of a portion of a rotor blade assembly, according to one example embodiment.
Figure 14B:
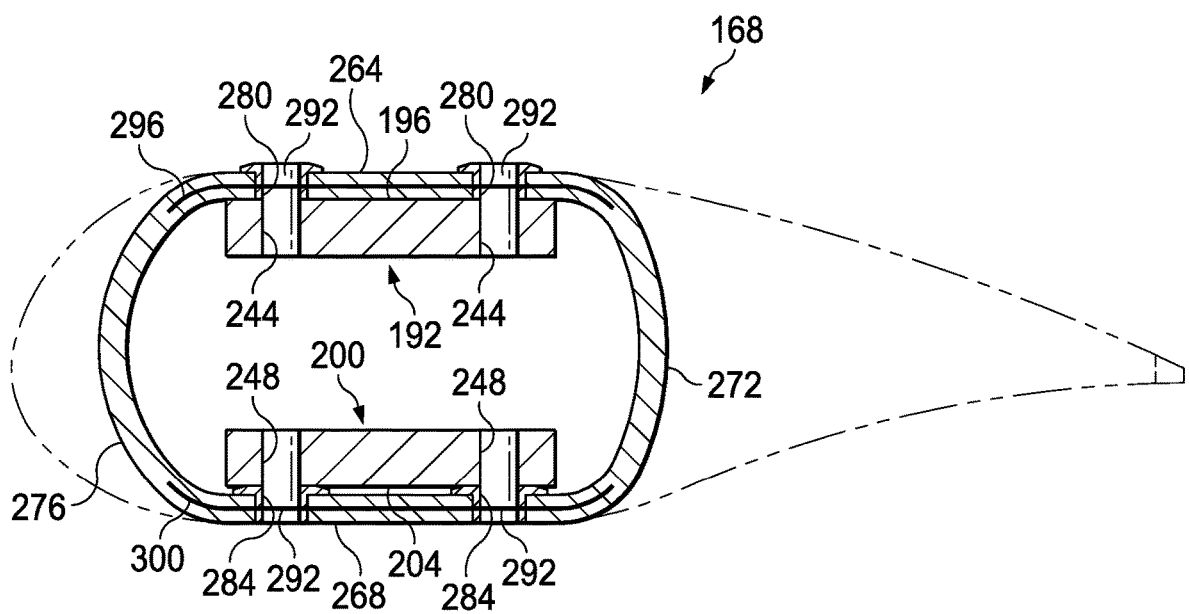
FIG. 14B is a cross-sectional view of the portion of a rotor blade assembly depicted in FIG. 14A.

As previously discussed, outboard feature 188 (and, more specifically, outboard lugs 192 and 200) is configured to be coupled to a portion of a rotor blade assembly and is depicted in some embodiments coupled to spar 168. In the embodiment shown, outboard lug 192 includes plurality of openings 244 extending through attachment surface 196, and outboard lug 200 includes plurality of openings 248 extending through attachment surface 204. As shown in FIG. 8, spar 168 includes inboard end 252, outboard end 256, and spar axis 260 extending between inboard end 252 and outboard end 256. In an embodiment, a plane is defined on the surface of spar 168 that is parallel to spar axis 260 and extends from leading edge 128 to trailing edge 132. As shown in FIGS. 14A-14B, spar 168 further includes spar cap 264, spar cap 268, curvilinear portion 272, and curvilinear portion 276, where spar caps 264 and 268 are spaced apart from each other and coupled to each other by curvilinear portion 272 and a curvilinear portion 276. In the embodiment shown, spar cap 264 includes plurality of openings 280 and spar cap 268 includes plurality of openings 284. Spar 168 and outboard feature 188 are positioned such that plurality of openings 244 and 248 of outboard lugs 192 and 200, respectively, align with plurality of openings 280 and 284 of spar 168, respectively, to enable a coupling device (e.g., bolts 292, in the embodiment shown) to extend through plurality of openings 244 and 248 of outboard lugs 192 and 200, respectively, and plurality of openings 280 and 284 of spar 168 to couple outboard feature 188 to spar 168. Outboard feature 188 can be coupled to spar 168 with other coupling devices using no openings, or one opening in each surface, or any other configuration to substantially prevent relative motion between adapter 164 and spar 168. In the embodiment shown, attachment surface 196 of outboard lug 192 is positioned adjacent spar cap 264, and attachment surface 204 of outboard lug 200 is positioned adjacent spar cap 268. A plane defined by at least one of attachment surfaces 196 and 204 is substantially parallel to spar axis 260 (a plane defined by both attachment surfaces 196 and 204 are substantially parallel to spar axis 260 in the embodiment shown). Furthermore, at least one of spar caps 264 and 268 are non-parallel to a plane defined by attachment surfaces 216 and 224 of inboard arms 212 and 220, respectively. In the embodiment shown, spar caps 264 and 268 are substantially perpendicular to a plane defined by each of attachment surfaces 216 and 224 of inboard arms 212 and 220, respectively; however, in other embodiments, spar caps 264 and 268 can intersect a plane defined by each of attachment surfaces 216 and 224 of inboard arms 212 and 220, respectively, at an angle between 0 and 90 degrees (e.g., 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees 10 degrees, 5 degrees, or less). Additionally, a plane defined by at least one of attachment surfaces 196 and 204 is substantially parallel to fold axis 184 (a plane defined by both attachment surfaces 196 and 204 are substantially parallel to fold axis 184, in the embodiment shown). However, in some embodiments, a plane defined by one or both of attachment surfaces 196 and 204 is non-parallel to fold axis 184, and fold axis 184 intersects one or both planes defined by attachment surfaces 196 and 204 at an angle between 0 and 90 degrees (e.g., 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 70 degrees, 85 degrees, or more).

Each of rotor blade assemblies 112 can be configured to include load-bearing material positioned within each rotor blade assembly 112. Load-bearing material assists in transferring load (e.g., centrifugal forces) from rotor blade assemblies 112 to hub 104 without damaging rotor blade assemblies 112 or affecting rotation thereof. Load-bearing material can be, for example, broadgoods fabric, layers of unidirectional material, filament windings, unidirectional belts, strands of material woven into rotor blade assemblies 112, woven composite fabric, woven composite fabric having a weave direction parallel to spar axis 260 of spar 168, and the like. As depicted in FIG. 14B, spar cap 264 includes load-bearing material 296, and spar cap 268 includes load-bearing material 300. Load-bearing material 300 can extend partially between inboard end 252 and outboard end 256 of spar 168 such that it is less than the total length of the spar 168 (e.g., 5%, 10%, 15%, 20%, 25%, 30%, 35%, 40%, 45%, or more of the total length of the spar 168), a majority of a distance between inboard end 252 and outboard end 256 of spar 168 (e.g., 51%, 55%, 60%, 65%, 70%, 75%, 80%, 85%, 90%, 95%, or more), or substantially all of a distance between inboard end 252 and outboard end 256 of spar 168. Load-bearing materials 296 and 300 are positioned within spar 168 such that least 80% (e.g., 80%, 85%, 90%, 95%, or more) of load-bearing materials 296 and 300 in spar 168 are positioned within spar cap 296 and spar cap 300 when compared to all components of spar 168. In other embodiments, load bearing materials 296 and 300 are positioned within spar 168 such that less than 80% (e.g., 75%, 70%, 65%, 60%, 55%, 50%, 45%, 40%, or less) of load-bearing materials 296 and 300 in spar 168 are positioned within spar cap 264 and spar cap 268 when compared to all components of spar 168, while maintaining a significant amount of load-bearing materials 296 and 300 positioned within spar cap 264 and spar cap 268 when compared to all components of spar 168. In an embodiment, the load-bearing materials 296 are at least 80% of the total length of the spar 168. In another embodiment. The load-bearing materials 296 are at least 80% of the total weight of the spar 168. In still another embodiment, the load bearing materials 296 are at least 80% of the total volume of the spar 168. In yet another embodiment, the load bearing materials are at least 80% of the skin of spar 168. As another example, load-bearing materials 296 and 300 are positioned within spar 168 such that substantially more of load-bearing materials 296 and 300 extend within spar caps 264 and 268, respectively, when compared to curvilinear portions 272 and 276 (e.g., spar caps 264 and 268 can include 30%, 35%, 40%, 45%, 50%, 55%, 60%, 65%, 70%, 75%, 80%, 85%, 90%, 95%, or 100% more load-bearing material than curvilinear portions 272).

As a further example, a majority (e.g., 51%, 55%, 60%, 65%, 70%, 75%, 80%, 85%, 90%, 95%, or 100%) of load-bearing materials 296 and 300 can extend within spar 168 substantially parallel to a plane defined by attachment surfaces 196 and 204, respectively, of outboard lugs 192 and 200, respectively. In such an example, a majority of the load experienced in each of rotor blade assemblies 112 can travel in a first direction, through spar caps 264 and 268 (and the load-bearing materials 296 and 300, respectively, therein), and into outboard lugs 192 and 200, respectively, with the loads traveling through outboard lugs 192 and 200 in substantially the same first direction. Furthermore, a majority (e.g., 51%, 55%, 60%, 65%, 70%, 75%, 80%, 85%, 90%, 95%, or 100%) of load-bearing materials 296 and 300 can extend within spar 168 substantially perpendicular to a plane defined by attachment surfaces 216 and 224 of inboard arms 212 and 220, respectively, or non-parallel to a plane defined by attachment surfaces 216 and 224 of inboard arms 212 and 220 (e.g., intersecting such planes at an angle of, for example, 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees 10 degrees, 5 degrees, or less). In such an example, a majority of load experienced in each of rotor blade assemblies 112 can travel in a first direction, through spar caps 264 and 268 (and the load-bearing materials 296 and 300, respectively, therein), into outboard lugs 192 and 200, respectively, in substantially the same direction, through inboard arms 212 and 220, respectively, in a second direction that is different from (e.g., non-parallel to) the first direction, and into grip 160 in a direction that is different from (e.g., non-parallel to) the first direction. In such an example, a majority (e.g., 51%, 55%, 60%, 65%, 70%, 75%, 80%, 85%, 90%, 95%, or 100%) of load-bearing materials 296 and 300 can extend within spar 168 substantially parallel to fold axis 184. As another example, in such an embodiment, a majority (e.g., 51%, 55%, 60%, 65%, 70%, 75%, 80%, 85%, 90%, 95%, or 100%) of load-bearing materials 296 and 300 can extend within spar 168 substantially perpendicular to a direction of rotation of a foldable portion of a rotor blade assembly (e.g., foldable portion 161 of rotor blade assembly 112).

The fold configurations, adapters, load-bearing material placement, and other features detailed above provide numerous advantages to rotor assemblies. For example, adapters configured in accordance with the above disclosure can significantly reduce the complexity of load-bearing material orientation, type, and configuration within rotor blade assemblies and, therefore, significantly reduce cost. Accordingly, adapters configured in accordance with the above disclosure permits a simplified rotor blade assembly and spar construction (e.g., broadgood low-cost mandrel-based manufacturing) and reduced complexity pertaining to additions and configurations of shear webs, fillers, belts, windings, rovings, and other load-bearing materials. Additionally, adapters configured in accordance with the above disclosure permit simplified geometrical complexities of the spar structure, which can reduce cost and improve manufacturability. This can, for example, enable the disclosed adapters to be retrofitted onto existing rotor assemblies or used with future rotor assemblies in a simplified, low-cost manner. Furthermore, adapters and rotor blade assembly features configured in accordance with the above disclosure can enable novel rotor blade assembly fold configurations, as depicted in the figures, and can achieve desired stiffness per weight ratios, including high stiffness per weight ratios, in rotor blades or portions thereof.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, RI, and an upper, $R_u$, is disclosed, any number falling within the range is specifically disclosed. In particular, the following numbers within the range are specifically disclosed: $R=R_l+$ $k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An adapter for a rotor blade assembly comprising:
a support member having an outboard surface and an inboard surface;
an outboard feature extending laterally from the outboard surface of the support member and including:
a first lug extending laterally from the outboard surface of the support member and having an attachment surface configured to couple to an outboard portion of a rotor blade assembly;
a second lug extending laterally from the outboard surface of the support member and having an attachment surface configured to couple to an outboard portion of a rotor blade assembly; and
a support structure extending outwardly from the outboard surface of the support member and between the first lug and the second lug, the support structure oriented substantially perpendicular to the outboard surface of the support member;
an inboard feature extending laterally from the inboard surface of the support member and including:
a first arm extending laterally from the inboard surface of the support member and having an attachment surface;
a second arm extending laterally from the inboard surface of the support member and having an attachment surface; and
a reinforcement path disposed in the support member, the first lug, the second lug, the first arm, and the second arm; the reinforcement path comprised of at least one of a filament winding and a composite fiber placement, at least a portion of the reinforcement path is a continuous loop;

wherein the outboard feature and the inboard feature are configured such that a plane defined by the attachment surfaces of at least one of the first lug and the second lug is non-parallel to a plane defined by the attachment surfaces of at least one of the first arm and the second arm.

2. The adapter of claim 1, wherein the first lug, the second lug, the first arm, and the second arm are integral with the support member.

3. The adapter of claim 1, wherein the attachment surfaces of the first arm and the second arm and the attachment surfaces of the first lug and the second lug are substantially perpendicular.

4. The adapter of claim 1, wherein the attachment surfaces of the first lug and the second lug are configured to be coupled to a spar having an inboard end, an outboard end, and a spar axis extending between the inboard end and the outboard end, and a plane defined by at least one of the attachment surfaces of the first lug and the second lug is substantially parallel to the spar axis.

5. The adapter of claim 1, wherein the attachment surfaces of the first arm and second arm are configured to be coupled to one of a portion of a rotor blade assembly and a hub such that rotation of the adapter is permitted about a fold axis, and a plane defined by at least one of the attachment surfaces of the first and second lugs is substantially parallel to the fold axis.

6. The adapter of claim 5, wherein a plane defined by at least one of the attachment surfaces of the first and second arms is substantially perpendicular to the fold axis.

7. The adapter of claim 1, wherein the adapter is made of composite fibers.

8. A tiltrotor aircraft rotor assembly comprising:
a hub having a hub axis about which rotor blade assemblies rotate; and
a plurality of rotor blade assemblies, at least one rotor blade assembly including a grip assembly coupled to the hub and each grip assembly including a grip fairing and a grip, the at least one rotor blade assembly including a spar with a spar cap and an adapter coupled to a portion of the grip and the spar cap, the adapter comprising:
a support member having an outboard surface and an inboard surface;
an outboard feature extending laterally from the outboard surface of the support member and coupled to the at least one rotor blade assembly, the outboard feature having at least one lug having at least one attachment surface adjacent to an interior surface of the spar cap; and
an inboard feature extending laterally from the inboard surface of the support member and coupled to the grip to form a hinge having a fold axis, the inboard feature having at least one arm having at least one attachment surface coupled to a portion of the grip, the attachment surface is substantially perpendicular to the fold axis;

wherein a plane defined by the at least one attachment surface of the at least one lug is non-parallel to a plane defined by the at least one attachment surface of the at least one arm;

wherein the fold axis at the hinge permits at least a portion of the at least one of the plurality of rotor blade assemblies to fold without removing the grip fairing;

wherein the hub axis and the fold axis are substantially parallel in a folded configuration;

wherein at least a portion of the at least one of the plurality of rotor blade assemblies can rotate about the fold axis by equal to or greater than 90 degrees in either direction.

9. The assembly of claim 8, wherein each rotor blade assembly includes an inboard end and an outboard end, the at least one of the plurality of rotor blade assemblies further comprising:
load-bearing material positioned within the at least one of the plurality of rotor blade assemblies such that at least 80 percent of the load-bearing material is substantially parallel to the fold axis, and such that at least 80 percent of the load-bearing material is substantially perpendicular to a direction of rotation of the rotor blade assembly.

10. The assembly of claim 8, wherein a plane defined by the at least one attachment surface of the at least one lug intersects a plane defined by the at least one attachment surface of the at least one arm to define an angle of at least 15 degrees.

11. The assembly of claim 8, wherein the spar cap comprises:
a first spar cap; and
a second spar cap spaced apart from the first spar cap and coupled to the first spar cap by a first curvilinear portion and a second curvilinear portion;
where the at least one lug is coupled to the interior of first spar cap and the second spar cap.

12. The assembly of claim 11, further comprising:
a load-bearing material positioned within the first spar cap and the second spar cap, where at least 80 percent of the load-bearing material in the spar is positioned within the first spar cap and the second spar cap.

13. The assembly of claim 11, wherein the assembly is configured such that the first spar cap and the second spar cap are non-parallel to a plane defined by at least one of the attachment surfaces of the first and second arms of the adapter.

14. The assembly of claim 8, further comprising:
an actuator coupled to the adapter and configured to rotate the adapter about the fold axis.

* * * * *